United States Patent [19]

Guy et al.

[11] Patent Number: 4,944,206

[45] Date of Patent: Jul. 31, 1990

[54] PROCESS AND INSTALLATION FOR PREPARING METAL BILLETS TO BE EXTRUDED

[75] Inventors: Bessey Guy, Auvers Sur Oise; Jean-Yves Bouchut, Sorbiers, both of France

[73] Assignee: Clecim, Cedex, France

[21] Appl. No.: 253,645

[22] Filed: Oct. 5, 1988

[30] Foreign Application Priority Data

Oct. 5, 1987 [FR] France .................. 87 13740

[51] Int. Cl.$^5$ ........................... B23D 33/02
[52] U.S. Cl. ........................... 83/42; 83/76.8; 83/168; 83/170; 83/364; 83/365; 83/370
[58] Field of Search .......... 83/15, 42, 71, 170, 83/360, 364, 365, 367, 370, 76–78, 168

[56] References Cited

U.S. PATENT DOCUMENTS

| | | | |
|---|---|---|---|
| 4,152,959 | 5/1979 | Elhaus | 83/372 |
| 4,328,725 | 5/1982 | Gschwend | 83/364 |
| 4,534,002 | 8/1985 | Urban | 83/364 |
| 4,559,854 | 12/1985 | Jürgens | 83/170 |
| 4,651,602 | 3/1987 | Harrold et al. | 83/364 |
| 4,677,838 | 7/1987 | Bessey et al. | 83/170 |
| 4,787,281 | 11/1988 | Gardner | 83/170 |

FOREIGN PATENT DOCUMENTS

| | | |
|---|---|---|
| 467087 | 10/1928 | Fed. Rep. of Germany . |
| 3120464 | 12/1982 | Fed. Rep. of Germany . |
| 55-150914 | 11/1980 | Japan . |
| 57-33913 | 2/1982 | Japan . |
| 62-162410 | 7/1987 | Japan . |

Primary Examiner—Douglas D. Watts
Assistant Examiner—Scott A. Smith
Attorney, Agent, or Firm—Pollock, Vande Sande & Priddy

[57] ABSTRACT

The invention relates to a process for preparing metal billets from bars (5) and to an installation comprising a heating furnace (2), means (10) for advancing the bars (5, 51) one behind the other along a straight path through the furnace (2), and hot shears (3) defining a shearing plane (Q) placed after the exit of the furnace (2).

According to the invention, the possible passage of the parting plane (6) between the bar (5) being cut and the following bar (51) through a stationary locating plane (P) intersecting the path of the bars at a point placed at a distance (Y) upstream of the shearing plane (Q) at least equal to the length (b) of a billet is monitored, and, in the event that such a passage is detected, from that moment the length of advance (X) of the bar (5) up to the stopping of the latter for shearing is measured continuously, then the remaining length (a=Y−X) of the bar (15) being cut and then the expected length of the remnant (c=a−nb) after the cutting of a whole number (n) of billets of normal length (b) counted from said detected passage moment are calculated, and the said remaining length (c) is compared with a given limit (L) in order to command the elimination of the oddments of a length below the said limit.

13 Claims, 7 Drawing Sheets

PROCESS AND INSTALLATION FOR PREPARING METAL BILLETS TO BE EXTRUDED

FIELD OF THE INVENTION

The invention relates to a process and apparatus for preparing metal billets intended especially for extension in an extrusion press, and also covers apparatus for locating the parting plane between two successive bars, which is particularly suitable for

BACKGROUND OF THE INVENTION

Metal sections are produced particularly from non-ferrous metals, such as brass, copper etc., in extrusion presses which comprise a container forming a receptacle which is closed at one end by means of a die and in which is placed a piece of metal, called a billet, which is made to pass through the die by extrusion. The press must be fed with billets of a length, depending on the dimensions of the container and on the length of the section to be produced.

The billets feeding the press must therefore be cut from metal bars, which have a cross-section identical to that of the container and a length of several meters.

The press is therefore fed by a billet preparation installation which comprises a storage magazine for the bars, a device for conveying the bars in succession along a generally straight path, shears located at the exit of the conveying device, and a loading device, for example a pivoting arm which receives each billet at the exit of the shears and which places it in the axis of the container where it is introduced by sliding.

For some time, hot shearing has become increasingly common. The installation then includes a heating furnace of tubular shape located in the path of the bars. Thus, a conventional installation comprises a storage table, a conveying device equipped with a pusher pushing the bars onto a straight conveyor which passes through a tubular furnace, and shears located at the exit of the furnace and associated with a loading device.

So that the bar does not have time to cool before it is sheared, the shears are located as close as possible to the exit door of the furnace, and according to an arrangement which is the subject of applicants' French Patent No. 84/18811 the shears can even be attached to the furnace, the exit door of which is formed by one of the jaws equipped, for this purpose, with a refractory protective covering.

After shearing, the bar is retracted into the furnace in order to clear the door and allow the latter to be closed.

The length of the furnace depends on its mode of heating, and induction furnaces can be shorter. In all cases, however, the conveyor supports several bars placed in sequence. When the rear end of the last bar is sufficiently advanced, a stop in the advance, for example for shearing, is utilized order to retract the pusher by the length necessary for introducing a new bar coming from the magazine onto the conveyor; the pusher subsequently moves forward again in order to bring the new bar into contact with the preceding one and push the set along. Thus, a continuous set of bars in contact one behind the other passes through the furnace.

By causing this set to advance progressively in this way, a certain number of billets can be cut from the first bar in the line, but the length L of the bar does not correspond exactly to an integral multiple of the length b of the billet, the more so because the latter may vary according to market requirements. As a result, at the end of shearing of the bar, it is exceptional, unless appropriate arrangements are made, if the shearing plane coincides exactly with the parting plane between the bar at the end of cutting and the succeeding bar. The last billet is thus formed from two adjacent pieces, which are, respectively, the rear end of the bar being cut and the front end of the succeeding bar.

The fact that the billet is in two pieces is not a disadvantage if these are of suitable length. In contrast, when the ratio of the length of the piece to its diameter is below a certain limit, such a piece, called an "oddment", can no longer be handled without the risk of coming askew in the loading device or in the container.

The "oddments" of a length below a given limit, for example half the diameter, which, depending on the position of the shearing plane in relation to the parting plane, can be on one side of the latter or the other, have to be eliminated, and several arrangements can be employed for this purpose.

It is possible, first of all, to cut the billet to the normal length and, if an "oddment" occurs, eliminate this by hand. However, there is a risk that the cut will not be made under good conditions, and it becomes necessary to extrude a billet which is shorter than normal. Furthermore, eliminating the "oddments" by hand impedes the shearing cycle and, to avoid a loss of metal, makes it necessary for them to be recycled. It is therefore preferable as far as possible to avoid the actual elimination of the "oddments" and, on the contrary, act on the length of the sheared billets, so as to prevent remnants which are too short from occurring.

In a known arrangement, for example, the length of each bar is measured at the start of conveyance, the length of the remnant to be expected is calculated in advance as a function of the normal length of the billet, and, if this remnant is too short, its length is distributed over the various billets by changing the lengths of these accordingly, in such a way that the shearing plane of the last billet coincides with the parting plane.

In another process, described in DE-A-No. 3,120,464, after the length of the bar has been measured, the length of the expected remnant is calculated in advance, and, if this is too short, before the shearing of the last billet the remnant is cut into two pieces of a length greater than the handling limit, one of these pieces being held in reserve and the other forming a billet with an additional piece taken from the succeeding bar, the piece held in reserve then returning to the advancing cycle in order, in turn, to form a billet together with a second additional piece.

However, in all cases, it is necessary to measure the length of the bar and deduce the length of the remnant from it after a whole number of billets of the desired length has been cut.

The length of the billet can be determined relatively easily, for example, by placing at the desired distance downstream of the shearing plane a stop which controls the halting of the advance and the operation of the shears (U.S. Pat. No. 4,559,854).

The length of the bar can be measured at the exit of the magazine and its arrival on the conveyor. In fact, the latter can be equipped with a retractable stop or with a stationary sensor which emits a signal at the moment when the front end of the bar passes level with it. To determine the length of the bar, it is sufficient to locate the position of the pusher abutting against its rear end at the moment when the signal is emitted by the stationary detector. However, this measurement is made under cold conditions upstream of the furnace, and it is therefore necessary to take into account the expansions and other secondary effects which can affect the length of the bar. The calculation means of automated installations can take these various parameters into account, but the result of this is some inaccuracy in the measurement.

There has also been a proposal to mark the parting plane, for example by bringing back into the furnace by means of the conveyor the bar which follows the bar being sheared, the rear end of the bar being cut then separating from the front end of the succeeding bar (U.S. Pat. No. 4,559,854). The conveyor can also be equipped with a sliding track having an articulated end, in order, at the exit of the furnace, to cause the bar being cut to be offset relative to the succeeding bar still in the furnace. Such devices make it possible to mark the parting plane and measure its position very accurately, but they are necessarily placed between the shears and the furnace and therefore require the shears to be moved away from the furnace exit, thus increasing the length of the bar which has to be reintroduced into the furnace after shearing, and consequently the time of the shearing cycle as well as the risk of cooling of the bar.

SUMMARY OF THE INVENTION

The subject o the invention is a process and apparatus free of the disadvantages of the known devices and making it possible, on the one hand, to calculate the expected length of the remaining piece sufficiently in advance to eliminate the "oddments" and, on the other hand, to carry out this measurement with great accuracy.

The invention applies especially to processes in which, in order to cut off a billet, the set of bars placed one behind the other on a conveyor is advanced until the front end of the bar leaving the furnace has gone beyond the shearing plane over a length equal to the length (b) to be given to the billet, and the stopping of the advance and then the shearing and the discharge of the sheared billet are then commanded.

According to the invention, during the advance of the bars one behind the other, the possible passage of the parting plane between the bar being cut and the succeeding bar is monitored continuously in a stationary locating plane intersecting the path of the bar at a point placed at a distance (Y) upstream of the shearing plane which is at least equal to the length (b) of a billet, and, if the passage of the parting plane is detected, the length (X) of advance of the bar is measured continuously from the moment of passage to the stopping of the bar for shearing, and the remaining length ($a = Y - X$) of the bar being cut is then calculated by subtracting the said length (X) from the distance (Y) between the locating plane and the shearing plane, and subsequently the algebraic value ($c = a - nb$) of the expected length of the piece remaining after the cutting of a whole number (n) of billets of length (b) is calculated by subtracting from the said remaining length of the bar the accumulated lengths of the billets which can still be sheared from the detection moment. The said expected length (c) can then be compared, in terms of absolute value, with a critical length (l) corresponding to the handling limit, and according to the result the shearing conditions can be determined in order to avoid producing, on one side of the parting plane or the other, an "oddment" of a length (c) below the said limit (l).

The invention also covers a billet preparation installation comprising, for carrying out the process, a means for the continuous measurement of the length of advance of the bar being cut at least from the passage of the front end through the shearing plane up to stopping for shearing, means for detecting the passage of the parting plane in a locating plane intersecting the path of the bar at a point placed at a distance (Y) from the shearing plane which is at least equal to the length (b) to be given to the billet, a means for determining the length of advance (X) of the bar from the moment of passage of the parting plane in the locating plane up to stopping for shearing, and means for calculating, on the one hand, the remaining length ($a = Y - X$) of the bar after the shearing of the billet and, on the other hand, the algebraic value of the expected length ($c = a - nb$) of the bar remnant after the shearing of a whole number (n) of billets of length (b) from the detecting moment, and means for comparing the absolute value of the said remaining length (c) with a given limit (l) in order to command the elimination of the remnants of a length below the said limit.

Advantageously, the means for measuring the length of advance of the bar comprises a stop for detaining the front end of the bar, mounted on a support moveable in the direction of advance, and a sensor for measuring the movements of the support, capable of supplying a signal which is a function of the advance of the stop under the action of the bar. Preferably, the retaining stop is mounted at the free end of an arm pivoting about an axis orthogonal to the direction of advance and associated with a rotary sensor for measuring the angular movements of the said arm, and the end of the pivoting arm carrying the stop is advantageously bent so as to penetrate within the shears from the downstream direction and place the stop in a standby position upstream of the shearing plane.

According to a known arrangement, it is advantageous to place the billet shears immediately downstream of the furnace exit, and in this case, according to another feature of the invention, the passage of the parting plane through the locating plane (P) is detected within the furnace itself.

It is then preferable to use a device for locating the passage of the parting plane which is specially designed for carrying out the process and which is also the subject of the invention.

According to the invention, the locating device comprises a means for cleaning the rear end of each bar before the introduction of the succeeding bar, a device for transmitting/receiving a light beam in a stationary plane transverse relative to the direction of movement of the bars and forming the measuring plane, and a means for detecting a sudden variation in the reflected light, occurring at the moment of passage through the measuring plane of the parting plane placed between the cleaned rear end of the bar and the rough front end of the following bar.

According to an especially advantageous arrangement, the transmitting/receiving device is mounted on an arm moveable transversely relative to the direction of movement of the bars and capable of passing through an orifice made in the bar-heating furnace, so as to come almost into contact with the bar being heated, the said orifice being equipped with a removeable closing door.

BRIEF DESCRIPTION OF THE DRAWINGS

The invention will be understood better from the following description of a particular embodiment given by way of example and illustrated in the accompanying drawings.

DESCRIPTION OF PREFERRED EMBODIMENT

Figure 1:
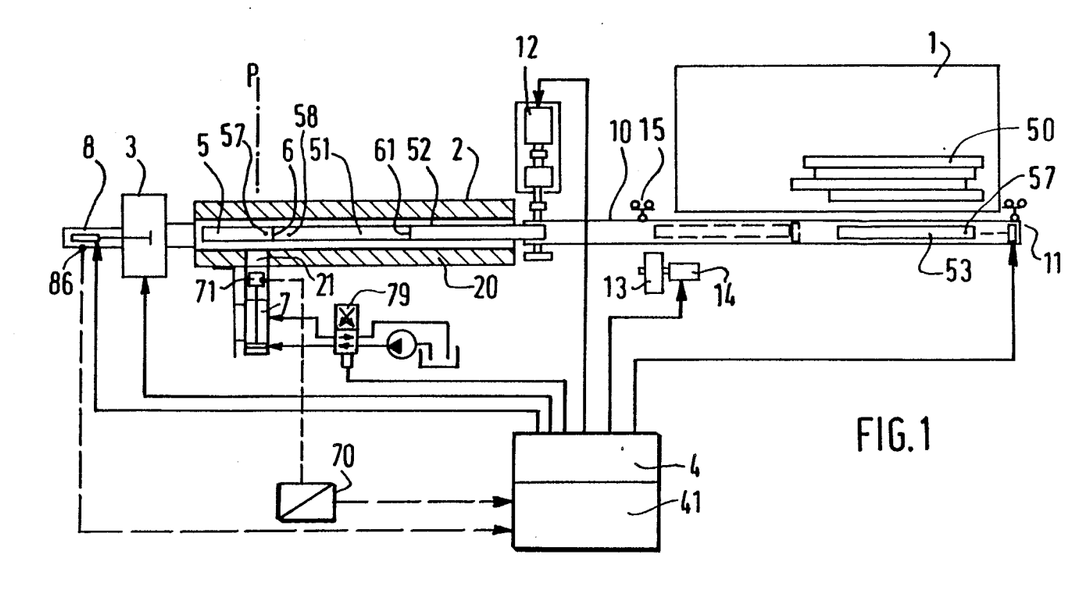
FIG. 1 is a general schematic view of a billet preparation installation according to the invention.

FIG. 1 illustrates schematically an entire billet preparation installation according to the invention.

In general terms, the installation comprises a storage table 1 associated with a conveyor 10, a heating furnace 2 and hot shears 3, all the operations being controlled from a control center 4.

The bars 5 stored on the storage table 1 are delivered in succession on to the conveyor 10 comprising, for example, a roller table defining a straight conveying path, along which a pusher 11 moves. Whenever a new bar is to be delivered onto the conveyor 10, the pusher 11 is retracted up to the downstream end of the latter and then advanced again, so as to bring the new bar 53 into contact with the bars 5, 51, 52 already in place on the conveyor and inside the furnace 2. The movements of the pusher 11 are controlled by a motor-drive device 12 according to commands given by the control center 4.

The length of the furnace depends on the arrangements used, but it is customary, in gas furnaces, to subject one or more bars 51, 52 to heating after the bar 5 being cut. The bars are placed one after the other, and their respective rear and front ends are therefore in contact in parting planes 6, 61.

The passage of the parting plane 6 through a measuring plane P is detected by a locating device 7 associated with the furnace 2.

At the exit of the furnace 2, the first bar 5, pushed by the other bars 51, 52, enters the shears 3, which is associated with a device 8 for measuring the sheared length.

Figure 2:
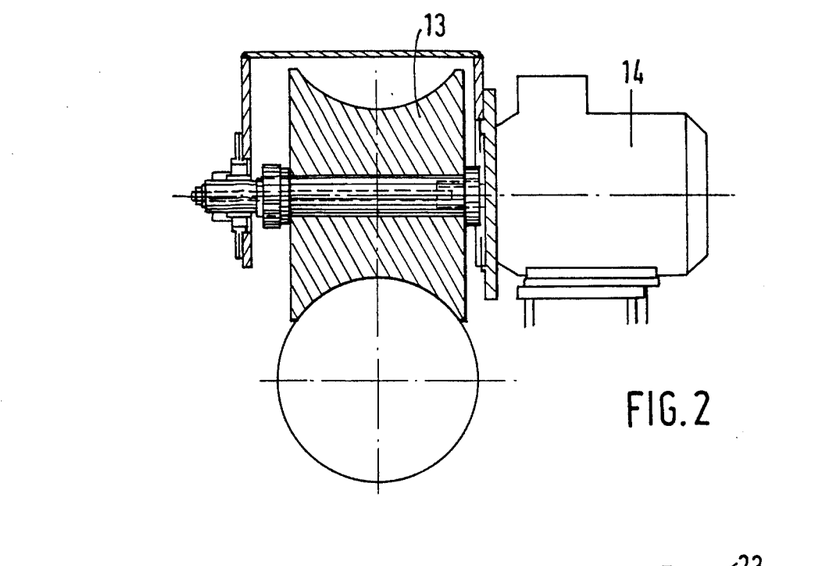
FIG. 2 shows the cleaning device in section in a plane transverse to the direction of advance.

According to one of the characteristics of the invention, the conveyor 10 is associated with a cleaning device comprising a brush 13 which is driven by a motor 14 and which, as shown in FIG. 2, has a rounded profile so as to match the cross-section of the bar. The brush 13 is placed at the height of the storage table 1, and during the advance of each new bar 53 on the conveyor 10, a sensor 15 enables the pusher 11 to be stopped when the brush 13 is level with the rear end 57 of the bar 53, in order to clean this rear end. Thus, in the succession of bars 5, 51, 52, each parting plane 6 is framed in the downstream direction by a bright surface forming the rear end 57 of the first bar and in the upstream direction by a dull surface formed by the rough front end 58 of the following bar.

Easily designed means controlled from the control center 4 make it possible to bring the brush 13 towards the bar at the moment of brushing and subsequently return it to the position of rest as a result of a movement transverse to the axis of travel.

Figure 3:
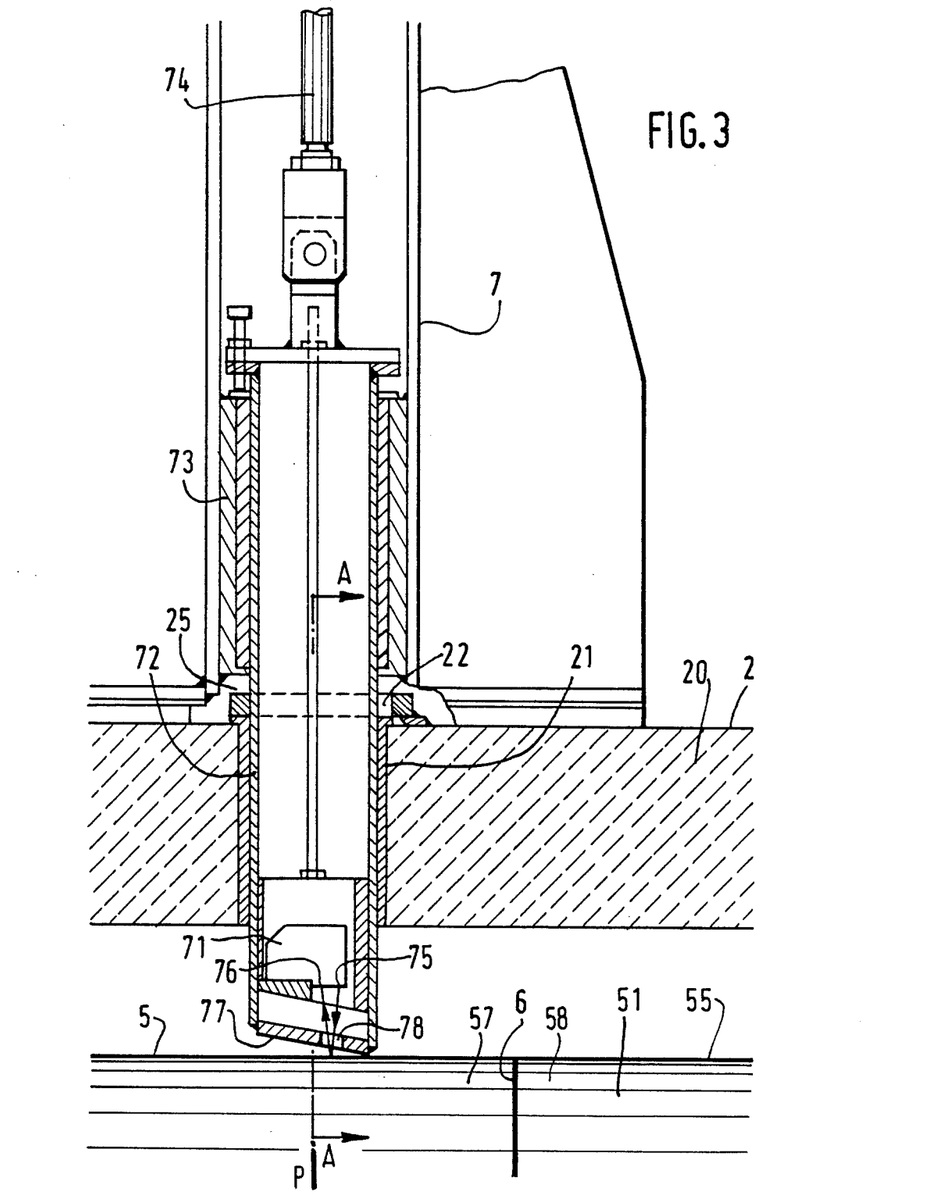
FIG. 3 shows the device for locating the parting plane in section in a plane passing through the axis of the furnace.
Figure 4:
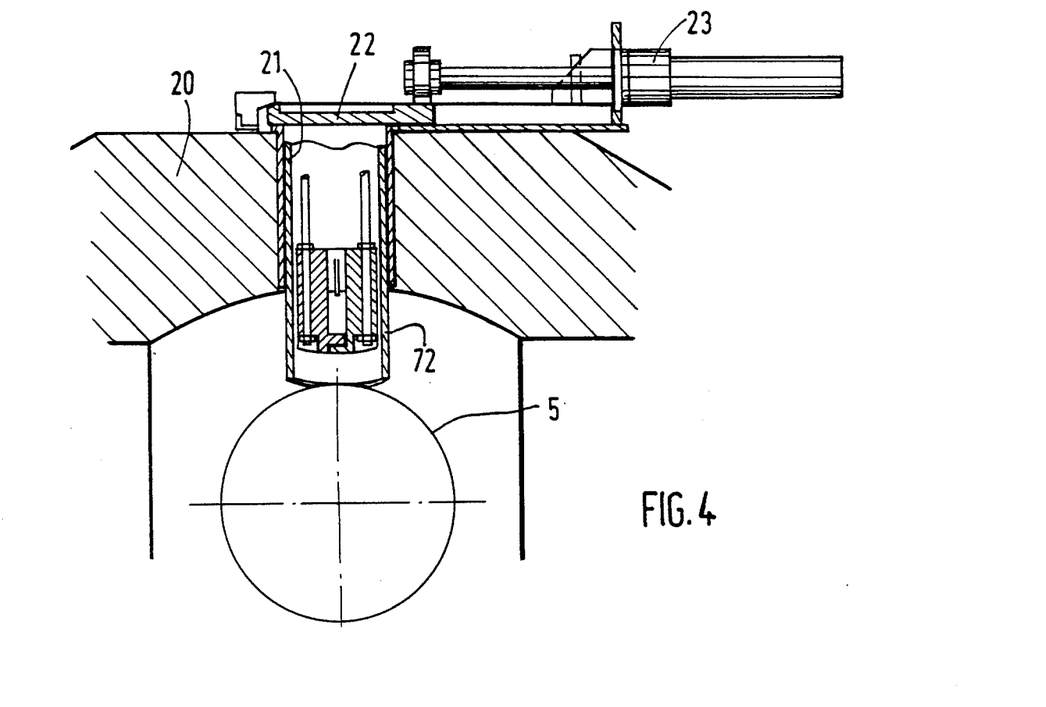
FIG. 4 is a view of the locating device in a cross-section along line A—A of FIG. 3.

The locating device 7 which, as seen in FIG. 1, is placed along the wall of the furnace 2 on the same side as the exit of the latter, is illustrated in detail in FIGS. 3 and 4. It comprises a sensor 71 mounted on the end of an arm 72 which can slide in a tubular support 73 in a direction transverse to the axis of the bars and of the furnace 2. The refractory wall of the latter is equipped, at the site of the locating device 7, with a passage orifice 21 which can be closed by means of a door 22 actuated by a jack 23 and mounted slideably in a space 25 formed between the support 73 and the outer wall of the furnace 2.

The transverse movement of the arm 72 is controlled by means of a rod 74 actuated by a jack 7, the movements of which are determined by a hydraulic circuit 79 controlled from the control center 4. The latter controls the opening of the door 22 and the advance of the arm 72 at the start of each cycle of advance of the bar. The sensor 71 carried by the arm 72 is composed of an infrared-light transmitting/receiving cell comprising a transmitter 75 and a receiver 76 for an infrared light beam in the form of a thin pencil directed in a plane P orthogonal to the axis of travel of the bars, the end of the arm 72 advantageously being equipped with a protective plate 77, in which an aperture 78 forming a diaphragm is made and which can come into the immediate vicinity of and even into contact with the wall 55 of the bar 5.

The sensor 71 is connected to a device 70, known for other uses, which makes it possible to record the variations in intensity of the reflected light, corresponding to a difference in brightness, and to transmit a signal to the control center 4 in the event that a light variation higher than a given threshold is detected.

As mentioned above, the rear end 57 of each bar 5 is cleaned by the brush 13, whereas the front end 58 of the following bar 51 remains rough.

Thus, at the passage of the parting plane 6 through the locating plane P along which the light is emitted, the sensor 71 records a variation in the reflected light attributable to the difference in brightness.

Of course, the light beam emitted by the sensor cannot be infinitely thin, but by calibrating the sensor it is possible to determine exactly the position of the parting plane 6 by setting the light variation threshold at which the signal is emitted. The device 7, 70 as a whole therefore makes it possible to determine with great accuracy the moment of passage of the parting plane 6 through the stationary locating plane P.

If such a light sensor is specially designed to function inside the furnace, however, another type of sensor could be used, for example an inductive sensor of a type known for other uses, making it possible to record variations in induced electrical currents generated by variable magnetic fields. In such a sensor, the variations in the induced currents reacting with the magnetic exciting field are measured selectively by means of symmetrical receiving coils arranged at the center of the exciting field. In the embodiment described above, the light sensor could therefore be replaced by an inductive sensor centered in the locating plane and comprising two independent measuring coils influenced solely by the electrical reaction coming from the surface of the bar (5) and making it possible to detect a high-frequency alternating voltage subsequently transmitted to an amplifier in order to emit a signal at the moment of passage of the parting plane through the plane of symmetry of the coils. The brush 13 would then be omitted, there being no need to clean the end 57 of the bar, but the rest of the installation could be unchanged.

At each cycle of advance of the bar for cutting a billet, the control center 4 commands the retraction of the arm 72 carrying the sensor 71 and the closing of the door 22 either immediately after the detection of the passage of the parting plane or at the end of advance of the bar if this passage is not detected. It is possible, moreover, to do without the location of the parting plane during most of the advance of the bar and command the operation of the arm 72 only towards the end of the cutting of the bar.

Figure 5:
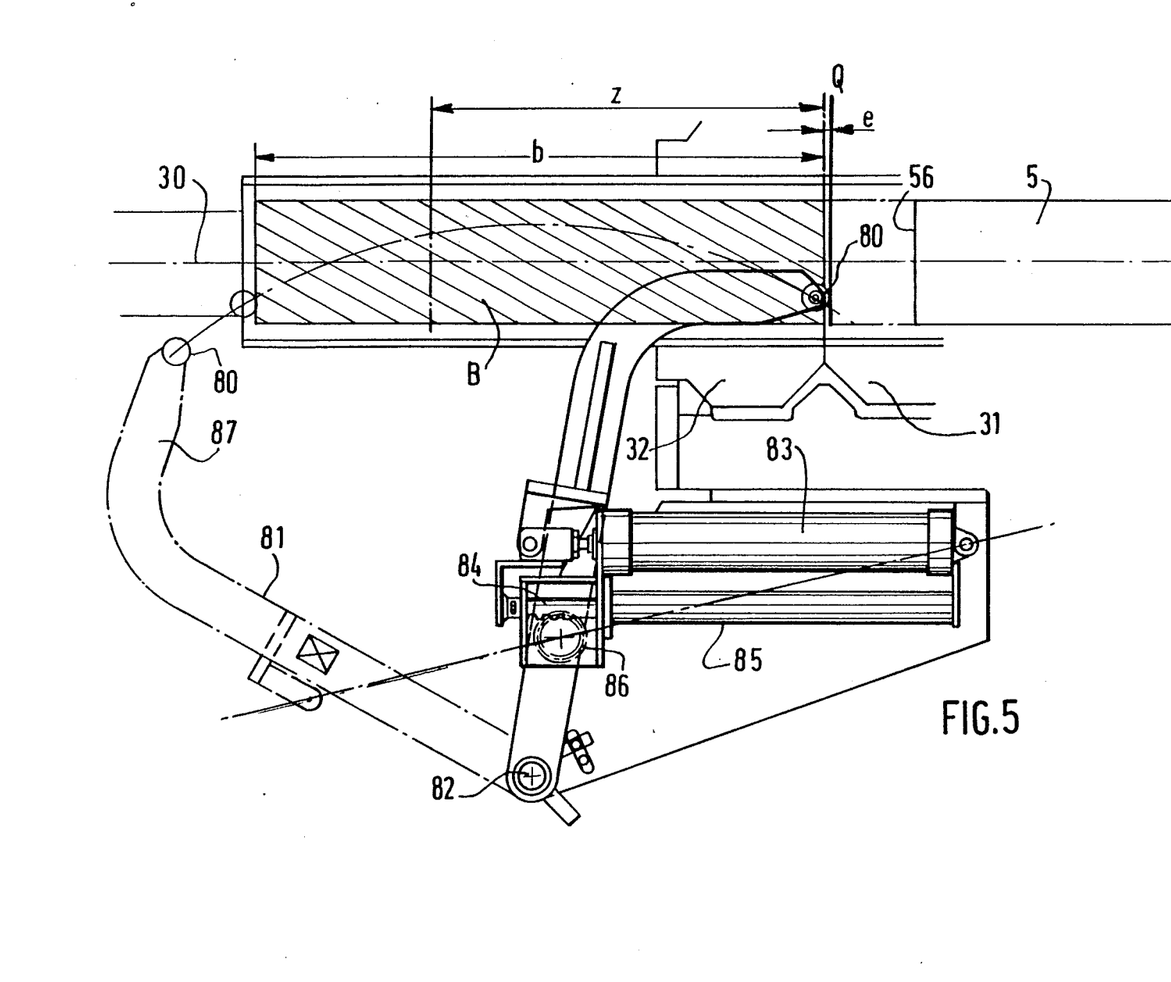
FIG. 5 is a schematic top plan view of the measuring device.
Figure 6:
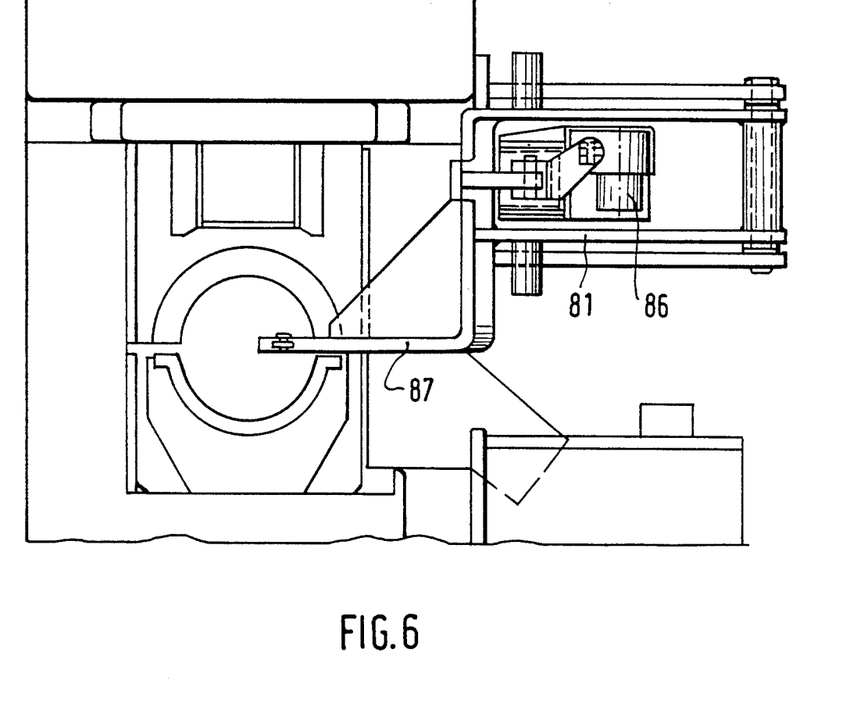
FIG. 6 is a front elevational view of the measuring device.

The shears 3 are of entirely conventional form and therefore, as shown partially in FIGS. 5 and 6, comprise two pairs of jaws, one 31 stationary and the other 32 moveable, which are joined in a shearing plane Q. On the other hand, the shears 3 are associated with a device 8 for measuring the advance of the bar beyond the shearing plane Q, which is illustrated in detail in FIGS. 5 and 6.

As can be seen from the top plan view of FIG. 5, the measuring device 8 comprises an arm 81 carrying a stop 80 at one end and articulated at its other end about a pivoting axis 82 orthogonal to the axis of the bars coinciding with the axis 30 of the shears.

The pivoting of the arm 81 can be controlled by means of a jack 83, the body and rod of which are articulated respectively on a stationary frame of the shears and on the arm 81. On the other hand, the rod of the jack is associated with a rack 84 which can slide in a sleeve 85 fixed to the body 83 of the jack, so as to follow the movements of the rod of the jack. On the other hand, the sleeve 85, at its end facing the arm 81, carries a rotary coder 86 comprising a pinion which meshes with the rack 84.

Finally, the end 87 of the arm 81 forms a bend capable of penetrating within the moveable jaw 32 of the shears over a sufficient length to ensure that the stop 80 comes slightly upstream of the shearing plane Q.

Thus, when the bar 5 is introduced into the furnace 2 in the position shown in FIG. 1, the jack 83 controls the turning back of the arm 81 in order to bring the stop 80 into the initial position defined above and represented by unbroken lines in FIG. 5. When the bar 5 is advanced, its front end 56 comes in contact with the stop 80 a little before it arrives at the shearing plane Q, from that moment pushing away the arm 81. The jack 83 is put in communication with the tank, in order to follow the movements of the arm 81 and the rack 84 freely. Consequently, in proportion as the stop 80 advances under the action of the bar 5, the rack 84 comes out of the sleeve, thereby rotating the sensor 86, the rotation of which thus gives an indication of the position of the stop 80, and the sensor can easily be calibrated.

Thus, the advance z of the front end of the bar beyond the shearing plane Q is measured by means of the rotary sensor 86, the sensor 86 transmitting a measurement signal to a computer 41 associated with the control center 4.

When the length of advance z beyond the hearing plane Q corresponds to the length b to be given to the billet, the control center 4 successively commands:
the device 12 for the motor-drive of the pusher 11 in order to determine the stopping of the advance,
the operation of the shears 3,
the stopping of the jack 83 for the pivoting of the arm 81, when the stop 80 is in the retracted position represented by dot-and-dash lines in FIG. 5.

After the cut, the billet B is taken over by a conventional loading device (not shown in the drawings).

After shearing, the bar 5 is reintroduced into the furnace 2 and a new cycle can begin. The shearing of the successive billets continues as long as the parting plane 6 between the bar being cut and the following bar has not passed through the measuring plane P. At the moment when this occurs, the cell 71 sends a signal to the computer 41 which determines the length of advance of the bar measured by the sensor 86 between the moment of passage and the stopping of the advance. The length X of advance of the parting plane 6 downstream of the measuring plane P is thus measured.

It can therefore be seen that, instead of computing the expected length of the bar remnant by a difference calculation from length measurements made before entry into the furnace and therefore far in advance, according to the invention this length is determined by means of a measurement made only a short time before the arrival of the parting plane at the shearing plane. Risks of error attributable particularly to expansions are virtually eliminated in this way.

Figure 7:
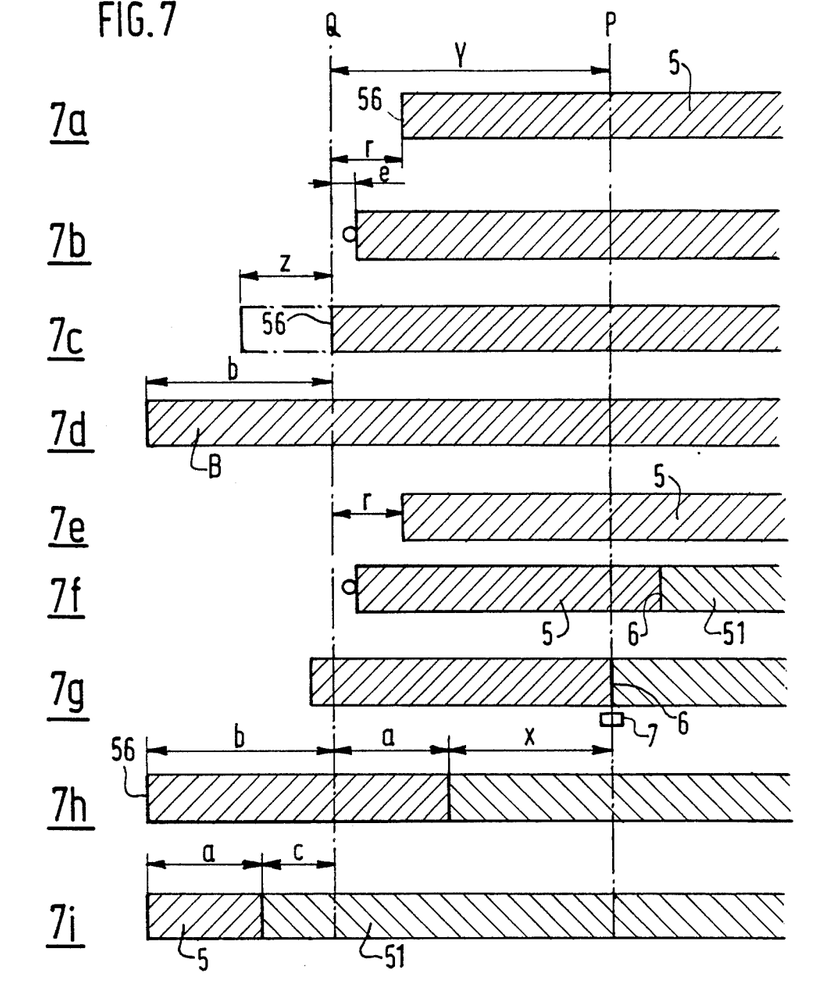
FIG. 7 shows schematically the various measuring operations during the advance of a bar and the shearing of a billet.

FIG. 7 shows schematically the successive steps of the measurement. In particular, the locating plane P and the shearing plane Q which are separated by the fixed distance Y have been indicated.

At the moment when the cycle starts, the bar 5 has reentered the furnace and its front face 56 is therefore retracted relative to the shearing plane Q by a distance (r) greater than the gap between this plane and the exit end of the furnace. The advance of the bar 5 is then commanded.

In the position 7b, the front face 56 comes in contact with the stop 80 which has been in the standby position, the latter being placed, as mentioned, upstream of the shearing plane Q at a distance (e) less than (r), for example 10 mm. It is thus certain that the measurement will be taking place at the moment when the front face 56 of the bar 5 passes through the shearing plane.

The advance of the bar 5 is continued, and from the moment, shown in FIG. 7c, when the front face 56 of the bar passes through the shearing plane Q, the control center 4 associated with the sensor 86 records the increase in length (z) of the bar which projects beyond the shearing plane Q downstream.

At the moment, shown in FIG. 7d, when this length z becomes equal to the length (b) to be given to the billet, the control center 4 commands the stopping of the advance, then the operation of the shears, and finally the retraction of the remaining part of the bar 5, so as to reintroduce it into the furnace into the position shown in FIG. 7e.

The cycle of advance thus begins again, as long as the parting plane 6 has not passed through the locating plane P.

FIGS. 7f to 7i illustrate the cutting of a last billet of length (b) from the bar 5.

In the position 7f corresponding to the start of measurement of the advance by the sensor 7, the parting plane 6 has not yet passed through the locating plane P, for it would otherwise have been detected at the end of the preceding cycle. The measurement is therefore taking place at the moment, shown in FIG. 7g, when the sensor 7 detects the passage of the parting plane 6 through the locating plane P.

On the basis of the measurement of the advance of the bar, made by the sensor 86, the computer 41 can therefore calculate, from the position 7c, the projecting length (z) downstream of the plane Q, and from the position 7g, the length of advance of the parting plane 6 in relation to the locating plane P.

When the front face 56 of the bar 5 reaches the distance (b) from the shearing plane Q in the position 7h, the bar stops and shearing is commanded. At this moment, the computer 41 determines the length of advance X of the parting plane 6 from the moment 7g of passage through the locating plane P, and then calculates the remaining length (a) of the bar after the shearing of the billet, making the subtraction $a = Y - X$, and finally the algebraic value of the difference $a - b$.

If this difference $a - b$ is negative, as shown in FIG. 7h, this means that it is still possible to cut a billet of length (b), but that the following billet will comprise the rear end 57 of the bar 5, of length (a), and the front end 58 of the following bar 51, of length (c) equal to the absolute value of the difference $|a - b|$.

The computer 41 therefore forms the absolute value of the difference $|a - b|$ in order to compare it with the critical length (l), beyond which the remaining piece would no longer be handleable. Under the circumstances of FIG. 7i, for example, the length (c) is greater than the limit (l) and the advance of the bars can therefore proceed normally, the following billet being composed of two pieces 57 and 58 of respective lengths (a) and (c).

Figure 8:
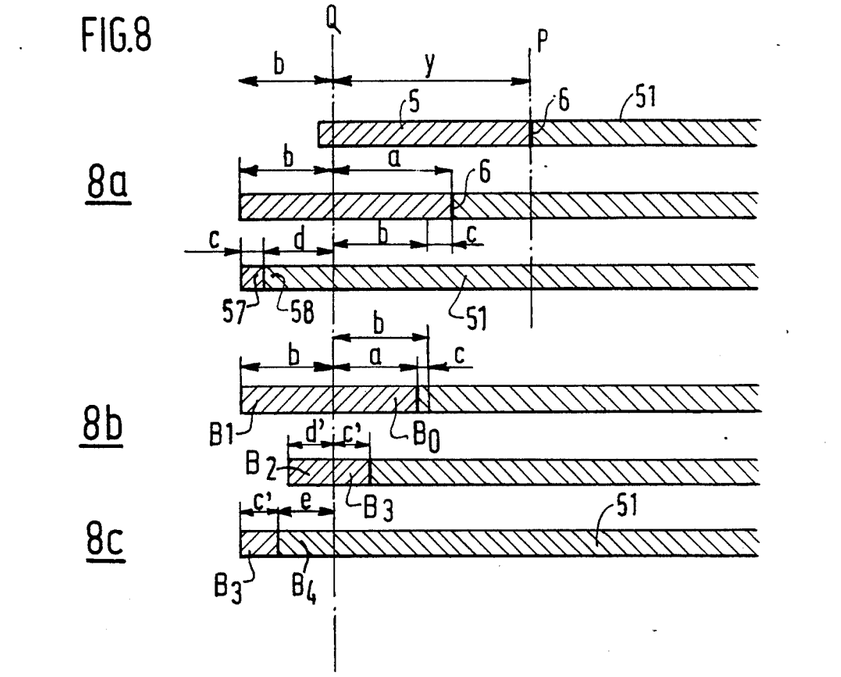
FIG. 8 shows schematically particular examples of shearing.

However, many other examples are possible, some of these being shown in FIG. 8.

First of all, as illustrated in FIG. 8a, if the length (b) to be given to the billet is less than half the distance Y between the shearing plane Q and the locating plane P, the difference $a - b$ is positive, (a) being greater than (b). In this case, it is theoretically possible to cut a new billet of length (b), the remaining piece of the bar 5 having a length (c) equal to $a - b$.

As before, if (c) is greater than the limit (l) selected for the "oddments", the advance can proceed normally, the following billet being composed of the rear end 57 of the bar 5, of length (c), and of the front end 58 of the following bar 51, of length (d).

In contrast, if, in either case, the expected length of the remaining piece $c = |a - b|$ is lower than the limit (l), the control center 4, informed by the computer 41, commands the elimination of the "oddments" in the way provided in the installation.

Various known means can be used for this purpose.

For example, the oddment can be allowed to occur and can be sheared and removed from the cycle of advance of the billets manually or automatically.

However, it is preferable to adjust the cycle of advance of the bar in order to prevent an oddment from occurring and thus obviate the need to shear it and handle it.

The means just described for calculating the expected lengths of the various pieces in advance make it possible to use in an advantageous way a known process for eliminating the oddments by putting a billet piece in reserve.

As shown in FIG. 8b, for example, the measurement of the expected length (a) of the piece $B_0$ remaining after the cutting of a last billet $B_1$ of normal length shows that the piece $B_0$ will have to be supplemented by an "oddment" of a length $c = |a - b|$ below the handling limit (l), this being desirable to avoid.

The billet $B_1$ is cut normally, but the control center is programmed subsequently to command the advance of the bars not over (b), but over a length (d') determined in such a way that the following are true simultaneously:

$$d' > 2l$$

$$a - d' > l$$

$$b - d' > l$$

The piece $B_2$ of length d' is then sheared and put in reserve, for example in the manner described in applicants' French Patent Application No. 86/15,349 of the same The remaining piece $B_3$ of the bar 5 being cut therefore has a length $c' = a - d'$ which, because of the choice of d', is higher than the handling limit. It is consequently possible to continue the advance of the bars until the length (b) is obtained and shear the following billet which is composed of the piece $B_3$ of length (c') and of a piece $B_4$ taken from the front end of the following bar 51 and having the length:

$$e = b - c' = b - a + d' = c + d'$$

If $c = b - a$ is positive, as in FIGS. 8b and 8c, (e) will always be greater than d' and therefore higher than the limit (l).

If $c = b - a$ is negative, since the "oddment" comprises the rear end of the bar 5, it will be seen that d' must be greater than 2 L, as mentioned above, so that the piece $B_4$ is of sufficient length.

The piece $B_2$ held in reserve is subsequently returned to the shearing cycle and supplemented by a piece of length $e' = b - d'$, in order to obtain a billet of length (b). It was seen that the length (d') is determined in such a way that this length (e') is likewise sufficient.

In the examples just described, the distance Y between the locating plane P and the shearing plane Q was of the order of double the length (b) to be given to the billets. Such a distance is suitable when the shears are attached to the furnace, according to the arrangement which is the subject of applicants' French Patent No. 84/18,811, and is necessary in order to satisfy the requirements of design and production simultaneously, to ensure high measurement accuracy and to incorporate the locating device (7) in the structure of the furnace (2).

On the other hand, it has just been seen that such a distance Y is sufficient for putting into practice the means for eliminating the oddments.

However, the distance Y could also be increased by shifting the locating plane P away from the shearing plane Q, to make it easier to incorporate the locating device (7) in the structure of the furnace (2) without appreciable modifications.

In this case, the calculation of the length (c) will have to take into account the number (n) of normal billets which can be cut from the bar, starting from the moment of location, and there will be:

$$c = a - nb$$

-n being a whole number depending on the distance Y between the locating planes P and the shearing plane Q.

However, the invention also applies to installations in which the shears are at a certain distance from the furnace, for example of the order of the length of the billet.

It is then possible to install the locating device (7) outside the furnace between the latter and the shears.

In this case, the parting plane (6) can be located by means of devices which it would have been impossible to use inside the furnace, such as an infrared or capacitive sensor system, as described above, or a viewing system comprising a line-scan camera, a light source and an image analyzer.

Although the invention is especially suitable for carrying out the known process of cutting the remnant into two parts, one of which is held in reserve, the means described for calculating the expected remaining length are still useful even if other means for eliminating the "oddments" are employed.

We claim:

1. A process for preparing from elongate bars (5) metal billets (B) having a length (b) and adapted to be extruded in an extrusion press, said process being carried out in apparatus comprising
    a storage magazine table (1);
    a tubular heating furnace (2) having an entrance and an exit,
    hot shears (3) defining a shearing plane (Q) located downstream of said exit of said furnace (2);
    a conveyor (10) for advancing said bars in succession along a generally straight path through said heating furnace (2) and said shears (3), said conveyor being associated with means for continuously measuring a length of advance of said bars and comprising means for stopping said advance when a length (b) of a said bar (5) to be cut has advanced downstream of said shearing plane (Q);
    a loading device for receiving each billet from said shears and for placing it in the axis of said extrusion press,
    said process comprising the steps of:
    (a) determining the position of a stationary locating plane (P) intersecting the path of said bars at a point placed at a distance (Y) upstream of said shearing plane (Q) at least equal to the length (b) of a billet;
    (b) advancing said bars (5, 51) one behind the other, the bars (5) to be cut being in contact with a succeeding bar (51) along a parting plane (6);
    (c) continuously monitoring, during the advance of said bars (5, 51), the possible passage of said parting plane (6) through said stationary locating plane (P);
    (d) in the event that such a passage is detected, continuously measuring the length of advance (X) of said bar (5) from the moment of passaging up to the moment of stopping the advance of said bars for cutting said bar (5);
    (e) calculating the remaining length ($a = Y - X$) of the bar (5) after cutting by subtracting said length advance (X) from the distance (Y) between said locating plane (P) and said shearing plane (Q);
    (f) deducing the expected length of said remnant ($c = a - nb$) after the cutting of a whole number (n) of billets of normal length (b) by subtracting from said remaining length (a) the accumulated lengths (n×b) of the billets which can still be sheared in said bar (5) from the detection moment;
    (g) comparing the absolute value of said expected length (c) with a critical length (1) corresponding to the handling limit of said remnant; and
    (h) determining the shearing conditions in order to prevent an oddment of a length below said critical length (1) from being produced on either side of said parting plane (6).

2. Process as claimed in claim 1, wherein, in the event an unhandleable oddment is expected to be produced:
    (a) determining a length (d') of a billet such that the following are true simultaneously:

$$d' > 22$$

$$a - d' > 1$$

(b) advancing the bar (5) by said length (d');
    (c) a piece B2 of length (d') is then sheared and held in reserve;
    (d) advancing the remnant part of said bar (5) and a succeeding bar (51) by said length (b) of a billet;
    (e) shearing a billet in two pieces;
    (f) returning said piece B2 held in reserve to the shearing cycle; and
    (g) advancing said piece B2 followed by said succeeding bar (51) by a length (b) for a further shearing of a billet in two pieces.

3. A process as claimed in claim 15 or 2, wherein the passage of the parting plane (6) through the locating plane (P) is detected inside the furnace (2), the latter being placed as near as possible to the shears (3).

4. Apparatus for preparing from elongate bars (5) metal billets (B) having a length (b) and adapted to be extruded in an extrusion press, said apparatus comprising
    (a) a storage magazine table (1)l;
    (b) a tubular heating furnace (2) having an entrance and an exit;
    (c) hot shears (3) defining a shearing plane (Q) located downstream of said exit of said furnace (2);
    (d) a conveyor (10) for advancing said bars in succession along a generally straight path through said heating furnace (2) and said shears (3), said conveyor being associated with means for continuously measuring a length of advance of said bars and comprising means for stopping said advance when a length (b) of a said bar (5) to be cut has advanced downstream of said shearing plane (Q);
    (e) a loading device for receiving each billet from said shears and for placing it in an axis of said extrusion press;
    (f) means for advancing said bars (5, 51) one behind the other, bars (5) to be cut being in contact with succeeding bars (51) along a parting plane (6);
    (g) means for continuously monitoring, during said advance of said bars, (5, 51), a possible passage of said parting plane (6) through a stationary locating plane (P), intersecting a pass of said bars at a point placed at a distance (Y) upstream of said shearing plane (Q) at least equal to a length (b) of a billet;
    (h) means for continuously measuring, in the event that such a passage is detected, the length of advance (X) of said bar (5) from the moment of passaging up to the moment of stopping the advance of the bars for cutting said bar (5);

(i) means for calculating a remaining length ($a=Y-X$) of said bar (5) after cutting by subtracting said length advance (X) from the distance (&) between said locating plane (P) and said shearing plane (Q);

(j) means for deducing an expected length of a remnant ($c=a-nb$) after cutting of a whole number (n) of billets of normal length (b) by subtracting from said remaining length (a) the accumulated lengths ($n \times b$) of billets which can still be sheared in said bar (5) from the detection moment;

(k) means for comparing an absolute value of said expected length (c) with a critical length (1) corresponding to a handling limit of said remnant; and (l) means for determining the shearing conditions in order to prevent an oddment of a length below said critical length (1) from being produced on one side or the other of said parting plane (6).

5. Apparatus as claimed in claim 4, wherein said means for monitoring the passage of said parting plane (6) between two metal bars (5, 51) through said stationary locating plane (P) comprises means (13) for cleaning a rear end (57) of each bar (5) before introduction of a succeeding bar (51), a device (71) for transmitting and receiving a light beam in a stationary plane transverse to a direction of travel of said bars and forming a measuring plane (P), and means (70) for detecting a sudden variation in reflective light, occurring at the moment of passage through said measuring plane (P) of said parting plane (6) between said cleaned rear end (57) of said bar (5) and a rough front end (58) of said succeeding bar (51).

6. Apparatus as claimed in claim 5, wherein said device for transmitting and receiving a light beam is mounted on an arm (72) moveable transversely to said direction of travel and adapted to pass through an orifice (21) in a wall (20) of said furnace (2), so as to come almost in contact with the bar (5), said orifice (21) being provided with a removable closing door (22).

7. Apparatus as claimed in claim 4, wherein said means (8) for measuring the length of advance of said bar comprises a stop (80) for retaining a front face (56) of said bar (5), mounted on a support (81) moveable in said direction of advance, and a sensor (86) for measuring movements of said support, said sensor being capable of supplying a signal which is a function of an advance of said stop (80) under the action of said bar (5).

8. Apparatus as claimed in claim 7, wherein said stop (80) is mounted on a free end (87) of an arm (81) pivoting about an axis (82) orthogonal to said direction of advance and associated with said sensor (86).

9. Apparatus as claimed in claim 8, wherein said free end (87) of said arm (81) is bent so as to penetrate within said shears (3) from a downstream direction and to place said stop (80) in a standby position upstream of said shearing plane (Q).

10. Apparatus as claimed in any one of claims 18 and 21 to 9, wherein said means (7) for locating said parting plane (6) is centered in a locating plane (P) intersecting a path of said bar (5) inside said furnace (2).

11. Apparatus as claimed in claim 10, wherein said means (7) for locating the passage of said parting plane (6) comprise a sensor (71) placed at an end of an arm (72) moveable transversely to an axis of said furnace (2) and passing through an orifice (21) in a wall (20) of said furnace (2), said orifice being provided with a removable door making it possible to open said orifice (21) in order to bring said sensor (71) into an immediate vicinity of said bar (5), and to subsequently reclose said wall (20) of said furnace (2) after retraction of said sensor (71).

12. Apparatus as claimed in one of claims 4 and 7 to 9, wherein said locating means (7) comprise a light sensor (71) comprising a cell (75, 76) for transmitting and receiving a light beam in a plane transverse to an axis of said bar (5), associated with means for detecting variation in reflected light, and wherein said means (10) for conveying the bars are associated with said means (13) for cleaning a rear end (57) of each bar, placed upstream of said furnace (2) and capable of revealing a difference in brightness between said cleaned rear end (57) and said still rough front end (58) of a succeeding bar (51).

13. Apparatus as claimed in any one of claims 18 and 21 to 9, wherein said locating means (7) comprise an inductive sensor comprising two induced-current measuring coils influenced by an electrical reaction coming from said bar (5) and associated with means for detecting induced currents in order to locate said parting plane (6).

* * * * *